April 22, 1952
W. S. PIKE
2,593,600
SIGNAL SELECTION
Filed May 1, 1951
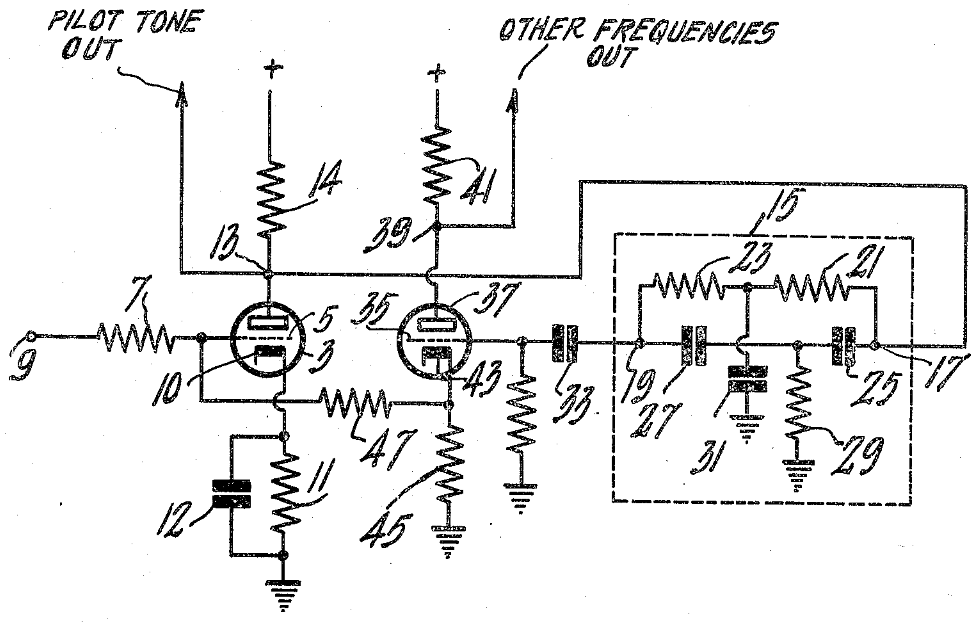
INVENTOR
Winthrop S. Pike
BY
ATTORNEY Patented Apr. 22, 1952 2,593,600

UNITED STATES PATENT OFFICE

2,593,600

SIGNAL SELECTION

Winthrop S. Pike, Princeton, N. J., assignor to Radio Corporation of America, a corporation of Delaware Application May 1, 1951, Serial No. 223,947

2 Claims. (Cl. 179—171)

This invention relates to signal transmission circuits, and more particularly to circuits designed to separate a given frequency signal from a composite signal containing the signal of the given frequency and other frequencies.

This invention finds one of its applications in portable television equipment designed for broadcasting from a point remote from the transmitter. In such equipment it is desirable to receive at the remote location a pilot tone signal and signals of other frequencies. The pilot tone signal is usually a 60 cycle tone to lock the synchronizing signal generator at the remote location. The other signal frequencies may represent speech signals, such as directions to the cameraman. It is convenient to transmit the pilot tone and the other frequencies as a composite signal and on a single channel and to separate them at the remote location.

It is accordingly an object of this invention to provide a simple circuit to separate a given signal frequency from a composite signal containing the signal of the given frequency and signals of other frequencies, the given signal being made available at one output terminal of the circuit, and the other signal being made available at another output terminal of the circuit.

According to the invention an attenuation network, providing a maximum signal attenuation at the given frequency, is coupled between the output of a first amplifier and the input of a second amplifier. Degenerative feedback means are provided for applying signals derived from the output circuit of the second amplifier to the input circuit of the first amplifier. For signals having frequencies other than the given frequency the second amplifier has full gain and the first amplifier has very low gain due to degenerative feedback. For the given frequency the second amplifier has very low gain due to the action of the attenuation network, there is no degeneration in the first amplifier, and the first amplifier has full gain.

Other and incidental objects of this invention will be apparent to those skilled in the art from a reading of the following specification and an inspection of the accompanying drawing, in which is shown a schematic diagram of an embodiment of this invention.

Referring now to the drawing, the circuit shown therein includes a first amplifier tube 3. The grid 5 of tube 3 is connected through a resistor 7 to an input terminal 9. The cathode 10 of tube 3 is connected to ground through a resistor 11 by-passed by a capacitor 12. The anode terminal 13 of tube 3 is connected to a source of positive potential through resistor 14, and is also connected to resistor-capacitor network 15. Resistor-capacitor network 15 has an input terminal 17, and output terminal 19, and includes the series resistors 21 and 23 connected in parallel with the series capacitors 25 and 27. A resistor 29 is connected between the junction of the capacitors 25 and 27 and ground. A capacitor 31 is connected between the junction of the resistors 21 and 23 and ground. This type of network is an attenuation circuit providing maximum attenuation at a selected frequency determined by the relative values of the circuit components, and is well known to those skilled in the art. The output terminal 19 of attenuation network 15 is connected through a coupling capacitor 33 to the grid 35 of a second amplifier tube 37. The anode terminal 39 of the tube 37 is connected to a source of positive potential through resistor 41. The cathode 43 of tube 37 is connected to ground through a resistor 45, and is also connected to the grid 5 of tube 3 through an isolating resistor 47.

The operation of the circuit shown in the drawing is as follows: a composite signal containing the pilot tone (for example 60 cycles) and other frequencies is fed to the input terminal 9 of tube 3. The signal output of tube 3 is fed to the input terminal of network 15 which provides maximum attenuation at the pilot tone frequency. The signal output of network 15 is fed to the input of tube 37. Two signal outputs are taken from tube 37: one signal output from the anode terminal 39 and one signal output from the cathode 43. It will be seen that network 15 produces on grid 35 a potential which will be high for all frequencies except the pilot tone frequency, and a greatly attenuated potential at the pilot tone frequency. At the same time the signal output taken from the cathode 43 of tube 37 and fed to the grid 5 of tube 3 will produce degeneration in tube 3 at all frequencies except the pilot tone frequency. Thus the pilot tone frequency will be available at the anode terminal 13 of tube 3, while signals of the other frequencies will be available at anode terminal 39 of tube 37.

The disclosed circuit has, among others, the following advantages: it uses no inductances which would be cumbersome for frequencies of the order of 60 cycles. Also the dip in the output voltage of tube 37 which occurs at the pilot tone frequency is sharper than the dip of the attenuation network taken alone. This is due to the fact that advantage is taken of the combined characteristics of a degenerative feedback circuit in which no degeneration, and consequently maximum gain is present at the pilot tone frequency, and the normal attenuation characteristic of the attenuation network: the increasing gain of the degenerative amplifier tends to hold up the overall response as the signal approaches the pilot tone frequency.

Having described my invention, what is claimed is:

1. A signal transmission circuit having one input terminal and first and secod output terminals and designed to obtain a pilot tone at said first output terminal and other frequencies at said second output terminal when a composite signal containing said pilot tone and said other frequencies is fed at said input terminal, said signal transmission circuit comprising a first amplifier having input and output circuits, means to apply said composite signal to the input circuit of said first amplifier, an attenuation network providing maximum attenuation at the pilot tone frequency, means for applying signals derived from the output circuit of said first amplifier to said attenuation network, a second amplifier having input and output circuits, means for applying signals derived from said attenuation network to the input circuit of said second amplifier, degenerative feedback means for applying signals derived from the output circuit of said second amplifier to the input circuit of said first amplifier, means connected to the output circuit of said first amplifier to obtain the pilot tone, and means connected to the output circuit of said second amplifier to obtain said other frequencies.

2. A signal transmission circuit for obtaining separately a pilot tone and other frequencies from a composite signal containing said pilot tone and said other frequencies, said signal transmission circuit comprising a first amplifier tube having an anode, a grid and a cathode, an attenuation network having input and output terminals and providing maximum attenuation at the pilot tone frequency, a connection from the anode of said first amplifier tube to the input terminal of said attenuation network, a second amplifier tube having an anode, a grid, and a cathode, a connection between the output terminal of said attenuation network and the grid of said second amplifier tube, degenerative feedback connection between the cathode of said second amplifier tube and the grid of said first amplifier tube, means connected to the anode of said first amplifier tube to obtain said pilot tone, and means connected to the anode of said second amplifier tube to obtain said other frequencies.

WINTHROP S. PIKE.

REFERENCES CITED

The following references are of record in the file of this patent:

UNITED STATES PATENTS

| Number | Name | Date |
|---|---|---|
| 2,494,426 | Beljers et al. | Jan. 10, 1950 |
| 2,495,511 | Dolberg | Jan. 24, 1950 |
| 2,544,344 | Miner | Mar. 6, 1951 |
| 2,570,294 | Mierlo | Oct. 9, 1951 |